United States Patent [19]

Graham

[11] Patent Number: 4,919,544

[45] Date of Patent: Apr. 24, 1990

[54] RETROFIT TELEPHONE NETWORK INTERFACE APPARATUS

[75] Inventor: Thomas G. Graham, Ocean, N.J.

[73] Assignee: Keptel, Inc., Tinton Falls, N.J.

[21] Appl. No.: 293,948

[22] Filed: Jan. 5, 1989

[51] Int. Cl.⁵ .............................................. H04M 1/00
[52] U.S. Cl. .................................... 379/399; 379/412; 379/327; 439/676
[58] Field of Search ....................... 439/676, 719, 235; 379/399, 412, 442, 443, 445; 361/356

[56] References Cited

U.S. PATENT DOCUMENTS 4,588,238  5/1986  Michelson et al. ............. 379/399 X
4,651,340  3/1987  Marson ........................... 379/327 X

OTHER PUBLICATIONS

ML-5, Keptel, Ocean, N.J., Apr. 1986.

Primary Examiner—Jin F. Ng
Assistant Examiner—Randall S. Vaas
Attorney, Agent, or Firm—R. Gale Rhodes, Jr.

[57] ABSTRACT

Retrofit apparatus for being mounted on a telephone terminal block previously mounted at a subscriber's premises and for providing a demarcation point at the telephone terminal block between an incoming telephone line and a subscriber premises line previously connected through first terminal means provided on the telephone terminal block, including telephone jack means for being connected to the first terminal means; second terminal means for being connected to the subscriber premises line upon the subscriber premises line being disconnected from the incoming telephone line; and telephone plug means connected to the second terminal means and for being plugged into the telephone jack means to interconnect the incoming telephone line and the subscriber premises line and for being unplugged from the telephone jack means to provide the demarcation point and permit the plug of an operating telephone to be plugged into the telephone jack means to facilitate determination of whether a fault exists on the incoming telephone line or the subscriber premises line.

13 Claims, 8 Drawing Sheets

RETROFIT TELEPHONE NETWORK INTERFACE APPARATUS

BACKGROUND OF THE INVENTION

Upon divestiture of the Bell Operating Companies from the American Telephone & Telegraph Company a demarcation point between an incoming telephone line and the interconnected subscriber premises line is to be provided at the subscriber premises. The demarcation point is to facilitate determination of whether a fault exists on the incoming telephone line or the subscriber premises line.

Typically, since divestiture, the demarcation point is provided by prior art telephone network interface apparatus mounted at the subscriber premises which includes a housing providing respective telephone company and subscriber compartments for mounting the respective telephone company and subscriber terminals, and other respective equipment, separate doors or covers for securing the respective compartments, and a telephone jack for connection to the incoming telephone line and a telephone plug for connection to the subscriber premises line. Upon the telephone jack and plug being connected to such lines, the telephone plug being plugged into the telephone jack, and a telephone being connected to the subscriber premises line, the telephone is rendered operable. Should the telephone become inoperable, the telephone plug is unplugged from the telephone jack and to provide the demarcation point and permit the plug of an operating telephone to be plugged into the jack to facilitate determination of whether a fault exists on the incoming telephone line or the subscriber premises lines, i.e. upon the plug of an operating telephone being plugged into the telephone jack and the telephone operating, the fault is determined to be on the subscriber premises line, however, upon the telephone not operating, the fault is determined to be on the incoming telephone line. Representative of such prior art telephone network interface apparatus or devices are those disclosed in U.S. Pat. Nos. 4,488,008 for TELEPHONE NETWORK INTERFACE DEVICE patented Dec. 11, 1984; 4,500,158 for NETWORK INTERFACE DEVICE patented Feb. 19, 1985; and 4,647,725 for INDOOR TYPE TELEPHONE NETWORK INTERFACE DEVICE patented Mar. 3, 1987.

Generally, such prior art telephone network interface apparatus are particularly useful, and economically feasible, at subscriber premises where only a relatively small number, e.g. 1, 2, 4, etc., of incoming telephone lines and subscriber premises lines are interconnected. However, at divestiture, the telephone network system throughout the country was, and largely still is, replete with 25, 50, etc. multi-line or pair telephone terminal blocks previously mounted or installed at various subscriber premises such as office buildings, condos, apartments, etc., for terminating or electrically interconnecting large numbers e.g. 25, 50, etc., of incoming telephone lines with an equally large number of subscriber premises lines. An example of such multi-line telephone terminal blocks is illustrated in FIG. 1 and identified by general numberical designation 10. Block 10 is typically mounted vertically at a multi-line subscriber premises and will be presumed to be for purposes of explanation a vertically mounted 50 line or pair telephone terminal block referred to in the art as the 66 block. Such 66 block 10 is provided with two vertically oriented parallel rows 12 and 14 of 25 pair each, e.g. pairs 16, 18, 20 and 22, of electrically conductive telephone terminals for electrically terminating or interconnecting 50 incoming telephone lines from a telephone central office 24 with 50 subscriber premises lines, e.g., pair of telephone terminals 16 electrically interconnect incoming telephone line 26 with subscriber premises line 28 connected to subscriber telephone 30 and pair of telephone terminals 20 electrically interconnect incoming telephone line 32 with subscriber premises line 34 connected to subscriber telephone 36. It will be noted from FIG. 1 that pair of telephone terminals 16 from row 12 and pair of telephone terminals 20 from row 14 are displaced horizontally on the telephone terminal block 10 with respect to each other and that the telephone terminals of each pair, e.g. telephone terminals 38 and 39 of pair 20 (lower righthand corner of FIG. 1) are displaced vertically with respect to each other and that each telephone terminal, e.g. telephone terminal 39, is provided with a pair of prongs 41 and 42 displaced horizontally with respect to each other and extending outwardly from the telephone terminal block 10. As may be noted by referring to the upper portion of FIG. 1, and pairs of telephone terminals 16 and 20, the inner prongs of each pair are typically electrically connected to the incoming telephone lines (e.g. incoming telephone lines 26 and 32) and the outer prongs of each pair are connected to the subscriber premises lines, e.g. subscriber premises lines 28 and 34. It will be further understood that the telephone terminal block 10 is made of a suitable electrically insulating material and that only the prongs of the telephone terminal extend outwardly from the telephone block with the interconnecting portions being typically embedded within the telephone terminal block. Still further, it will be understood that each incoming telephone line and each subscriber premises line is comprised of two electrical conductors typically referred to in the art as tip T and ring R as illustrated in FIG. 1.

Typically, the previously mounted multi-line telephone terminal blocks are without means to provide the needed e.g. 25, 50, etc., demarcation points between the incoming telephone lines and the interconnected subscriber premises lines; the 66 block 10 of FIG. 1 requires, for example, means for providing 50 demarcation points between the 50 incoming telephone lines and the 50 subscriber premises lines interconnected at the block. The typical size of the above-noted prior art telephone network interface apparatus is such that they are too large to be mounted on such previously mounted multi-line telephone terminal blocks, e.g. 66 block 10, and the typical cost of such telephone network interface apparatus is such that they are too expensive to provide the needed large number, e.g. 25, 50, etc., of demarcation points.

Accordingly there exists a need in the telephone network interface system art for retrofit apparatus for retrofitting these previously mounted telephone multi-line telephone terminal blocks to provide them with such large number of needed demarcation points.

Further, for present market acceptability, it is believed to be desirable to provide such needed retrofit apparatus utilizing presently available, so-called standard, RJ-11 telephone plug and jack, or at least equivalent structure of the RJ-11 jack. However, the width of such RJ-11 telephone plug, and the width of the space typically available on these previously mounted multi-line telephone terminal blocks for mounting the needed retrofit apparatus supporting the RJ-11 jack or its equivalent, are such that a difficult problem is presented as will be better understood by reference to FIG. 2. [It will be understood that since the subscriber line extending from a subscriber's telephone terminates in a telephone plug, typically the standard RJ-11 telephone plug the telephone jack comprising the demarcation point must be connected to the incoming telephone line and hence such jack must be mounted on the retrofit apparatus and for present market acceptability desirably is an RJ-11 telephone jack or the equivalent structure for receiving the RJ-11 telephone plug.] More specifically, the width W1 (FIG. 2) of such RJ-11 telephone plug 40 is approximately 0.380 inch and the width W2 of the space available on multi-line telephone terminal block 10 between pairs of telephone terminals, e.g. 42, 43, 44 and 45 in a vertical row thereof, for mounting the needed retrofit apparatus, and hence the width available for mounting the RJ-11 jack or its equivalent structure, is typically only approximately 0.400 inch leaving only approximately 0.020 inch available for the opposed walls of the telephone jack or its equivalent structure plus clearance between adjacently mounted retrofit apparatus. This means that, with clearance, the width of each opposed wall of the telephone jack or its equivalent structure, must be less than approximately 0.010 inch, and considering the realities of present economically feasible manufacture, such wall thickness is too small for realistic consideration. Thus it has been discovered that to mount a plurality of such retrofit apparatus adjacently on such previously mounted multi-line telephone terminal block to provide the large number of needed demarcation points, the opposed walls of the telephone jack, or the equivalent structure, must be open. This means that a telephone plug plugged into such open wall telephone jack is unprotected from disturbance, e.g. unintentional unplugging due to the intentional unplugging of adjacent telephone plugs from the telephone jacks of adjacent retrofit apparatus, jostling of the telephone plug sufficient to interrupt the connection provided by the telephone plug between an incoming telephone line and a subscriber premises line, etc.

Accordingly, there exists a further need in the art for providing such retrofit apparatus wherein a telephone plug plugged into such open walled telephone jack is free, or at least substantially free, from such disturbance.

SUMMARY OF THE INVENTION

It is the object of the present invention to provide retrofit apparatus satisfying the above-noted needs.

Retrofit apparatus satisfying such needs and embodying the present invention may include apparatus for being mounted on a telephone terminal block previously mounted at a subscriber's premises and for providing a demarcation point at the telephone terminal block between an incoming telephone line and a subscriber premises line previously connected through first terminal means provided on the telephone terminal block, including telephone jack means for being connected to the first terminal means; second terminal means for being connected to the subscriber premises line upon the subscriber premises line being disconnected from the incoming telephone line; and telephone plug means connected to the second terminal means and for being plugged into the telephone jack means to interconnect the incoming telephone line and the subscriber premises line and for being unplugged from the telephone jack means to provide the demarcation point and permit the plug of an operating telephone to be plugged into the telephone jack means to facilitate determination of whether a fault exists on the incoming telephone line or the subscriber premises line.

The present invention is the subject of Disclosure Document No. 192500 filed at the United States Patent and Trademark Office on Jan. 19, 1988.

DESCRIPTION OF THE DRAWINGS

FIG. 13 is an exploded perspective view of an alternate embodiment of retrofit apparatus embodying the present invention and including an internal space for receiving or housing one or more telephone circuits such as a maintenance termination unit, a half-ringer, RF filter, sneak current protector, or the like.

DESCRIPTION OF THE PREFERRED EMBODIMENTS

Figure 1:
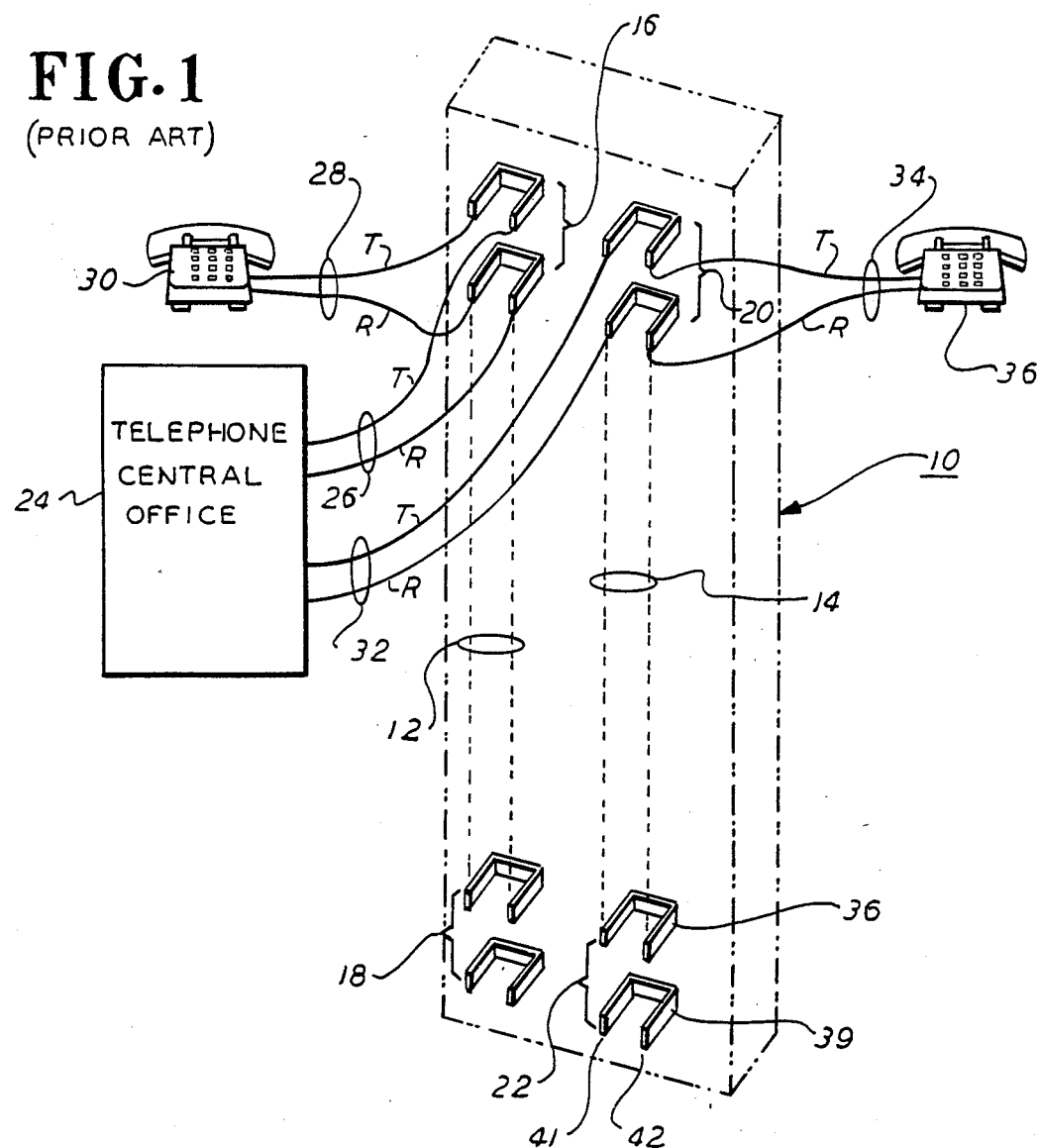
FIG. 1 is a partial perspective, diagrammatical illustration, of the pertinent prior art.
Figure 2:
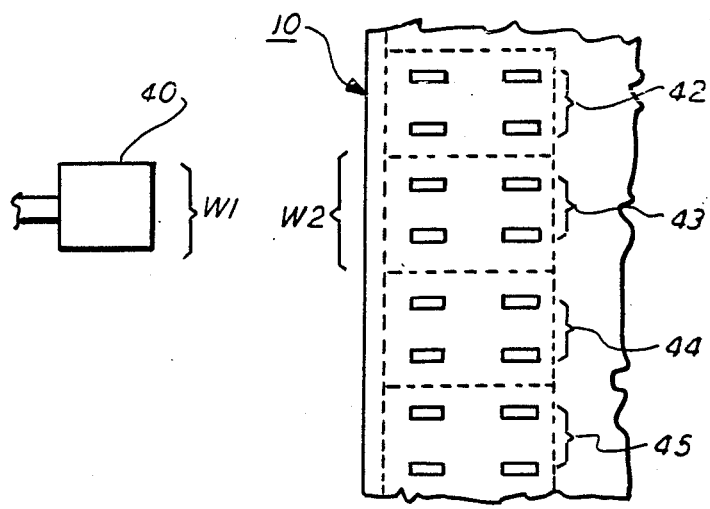
FIG. 2 is a partial front elevational view of the pertinent prior art.
Figure 3:
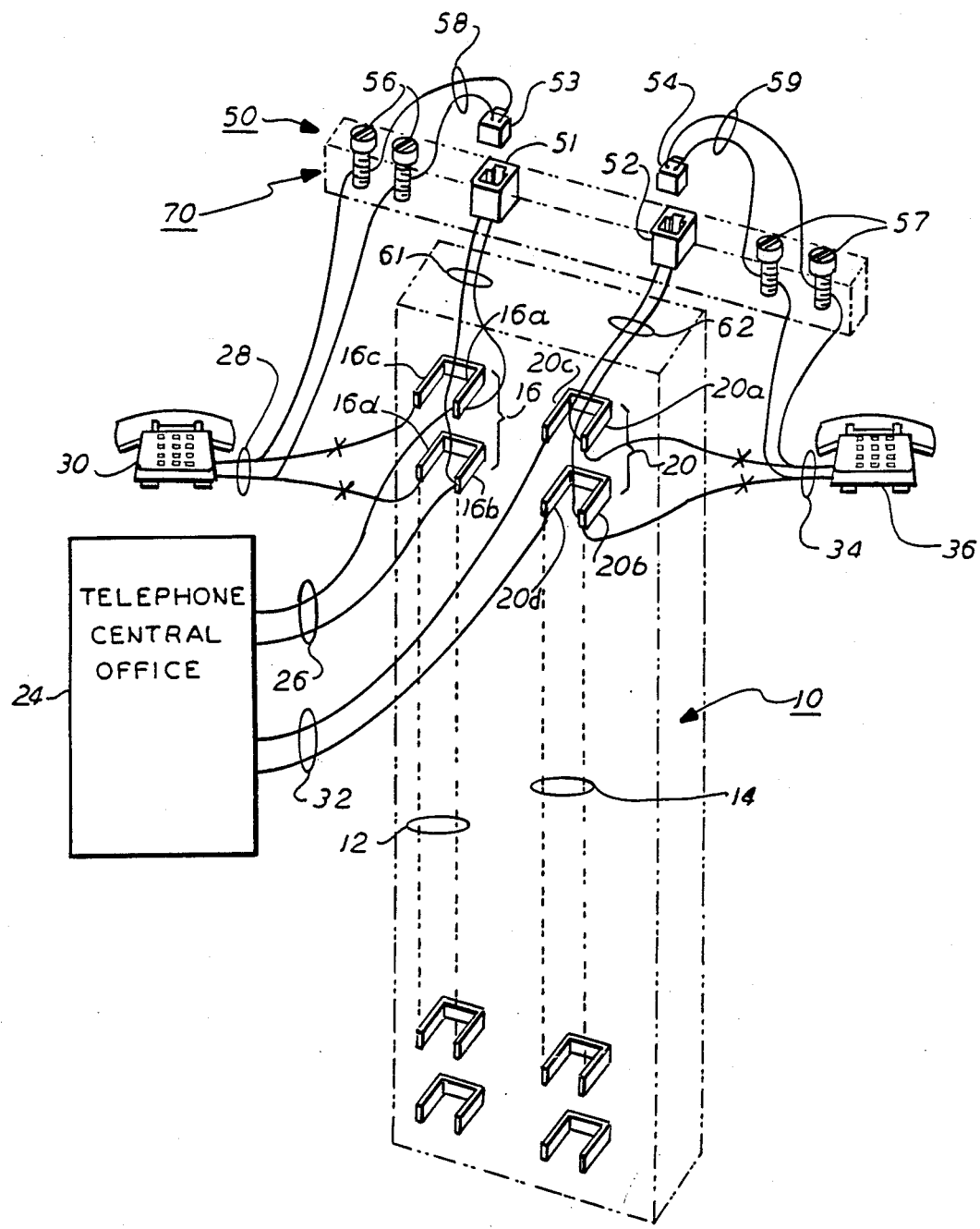
FIG. 3 is a partial perspective view illustrating diagrammatically, retrofit apparatus embodying the present invention.

Referring now to FIG. 3, it will be understood that the structure of FIG. 1 is shown therein and that retrofit apparatus embodying the present invention and identified by general numerical designation 50 is also shown therein. Generally, it will be understood that the retrofit apparatus 50 is for being mounted to the multi-line telephone terminal block 10, in a manner described in detail below, and is for providing a demarcation point between incoming telephone line 32 and subscriber premises line 28 and a demarcation point between incoming telephone line 32 and subscriber premises line 34. It will be further understood that the retrofit apparatus 50 also may be used to provide a single demarcation point between an incoming telephone line and a subscriber premises line, and that such is within the contemplation of the present invention. More particularly, it will be understood that the retrofit apparatus 50 includes a pair of telephone jacks 51 and 52, a pair of telephone plugs 53 and 54, and a pair of subscriber terminals 56 and 57. For utilization, the subscriber premises lines 28 and 34 are disconnected from the pair of telephone terminals 16 and 20, as indicated by the X's, and electrically and mechanically connected to the pair of subscriber terminals 56 and 57. The telephone plugs 53 and 54 are electrically connected to the subscriber terminals 56 and 58 by a pair of electrical conductors 58 and 59 and the pair of telephone jacks 51 and 52 are electrically connected to the pair of telephone terminals 16 and 20 by electrical conductors 61 and 62. The telephone plugs 53 and 54 may be unplugged from the telephone jacks 51 and 52 to provide demarcation points between the incoming telephone lines 26 and 37 and the subscriber premises lines 28 and 34 to permit telephone plugs of operating telephones (not shown) to be plugged into the telephone jacks 51 and 52 to facilitate determination, in the manner described above, as to whether or not a fault exists on the incoming telephone lines or the subscriber premises lines. The retrofit apparatus 50 may include a mounting member, indicated by general numerical designation 70 and shown in dashed outline in FIG. 3, for being mounted on the block 10, in a manner described in detail below, and on which mounting member the pair of telephone jacks 51 and 52 may be mounted or provided and on which the pair of subscriber terminals 56 and 57 may be mounted.

Figure 4:
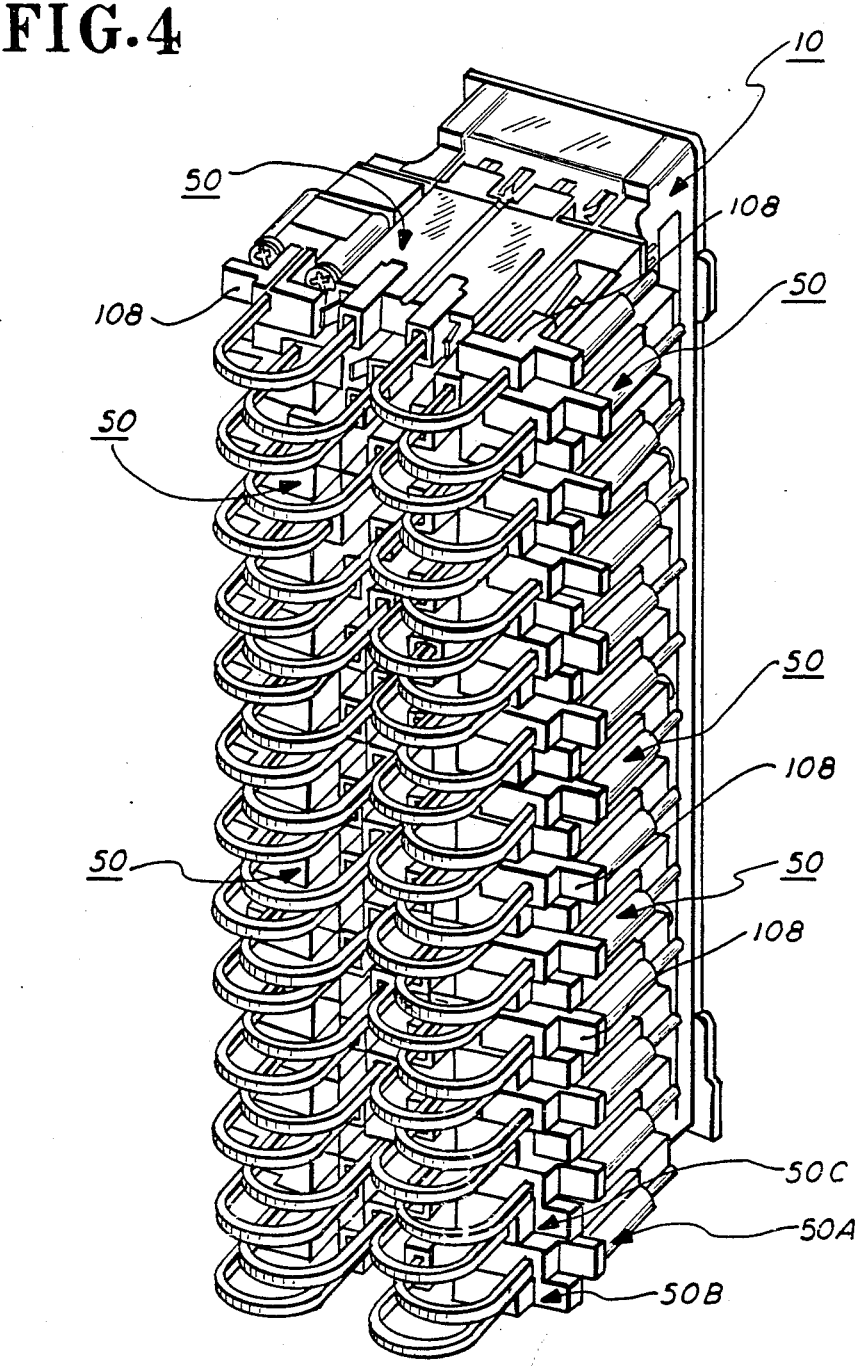
FIG. 4 is a perspective elevational view illustrating the staggered mounting, or lateral displacement, of the retrofit apparatus of the present invention for closing the open side walls of the telephone jack of the retrofit apparatus of the present invention to protect a telephone plug plugged therein against disturbance.

A detailed description of the structure of a preferred embodiment of the retrofit apparatus 50 including the mounting member 70 will now be presented. Referring now to FIG. 4, the 66 block type 50 line telephone terminal block 10 referred to above is shown, and it will be presumed that such block has been previously mounted vertically at subscriber's premises, such block is provided with the two vertical rows 12 and 14 (FIGS. 1 and 3) of pairs of telephone terminals (e.g. pairs 16 and 20 of FIG. 1), 25 pairs of telephone terminals in each row. The block 10 will be further presumed to have previously terminated or interconnected 50 incoming telephone lines with 50 subscriber premises lines by such lines being interconnected to the pairs of telephone terminals as described above with regard to FIG. 1. A plurality of retrofit apparatus 50 embodying the present invention are shown in FIG. 4 mounted adjacently, in vertical abutment on the block 10 in a vertical row with adjacent ones thereof being staggered or displaced a predetermined distance laterally, alternately rightwardly and leftwardly, with respect to each other. By way of specific example, and referring to the bottom portion of FIG. 4, it will be noted that retrofit apparatus 50A is staggered or displaced laterally rightwardly with respect to next adjacent retrofit apparatus 50B and 50C, or conversely, that adjacentretrofit apparatus 50B and 50C are staggered or displaced laterally leftwardly with respect to the intermediate retrofit apparatus 50A. It will be understood generally, and will be explained in detail below, that this staggering or lateral displacement of adjacent retrofit apparatus is done in accordance with the teachings of the present invention whereby predetermined portions of adjacent retrofit apparatus of the present invention close, or effectively close, the open walls of the telephone jacks of the present invention (noted above) to protect telephone plugs plugged therein against disturbance of the types noted above.

Figure 5:
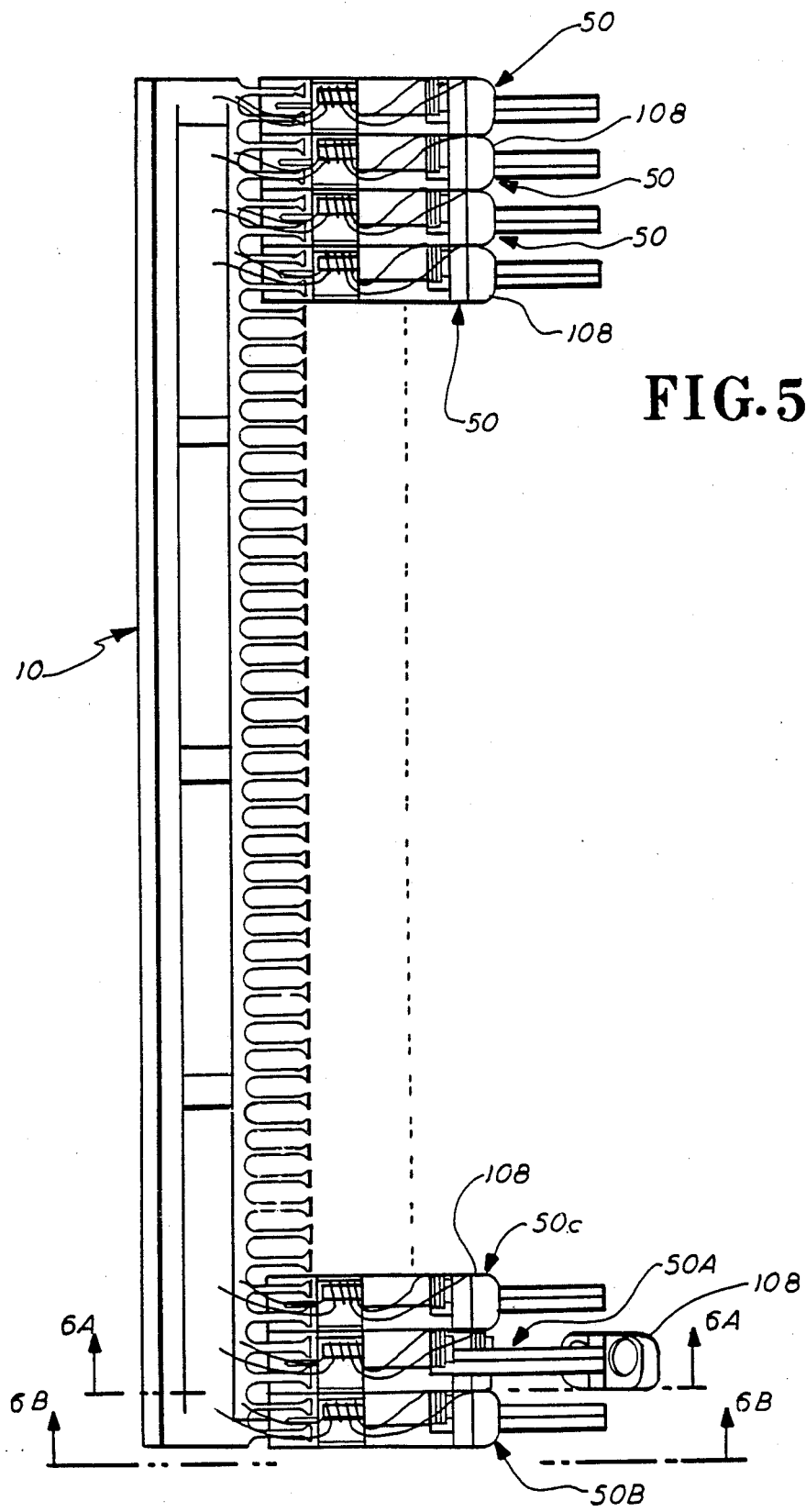
FIG. 5 is a partial left side view of the structure illustrated in FIG. 4.
Figure 6A:
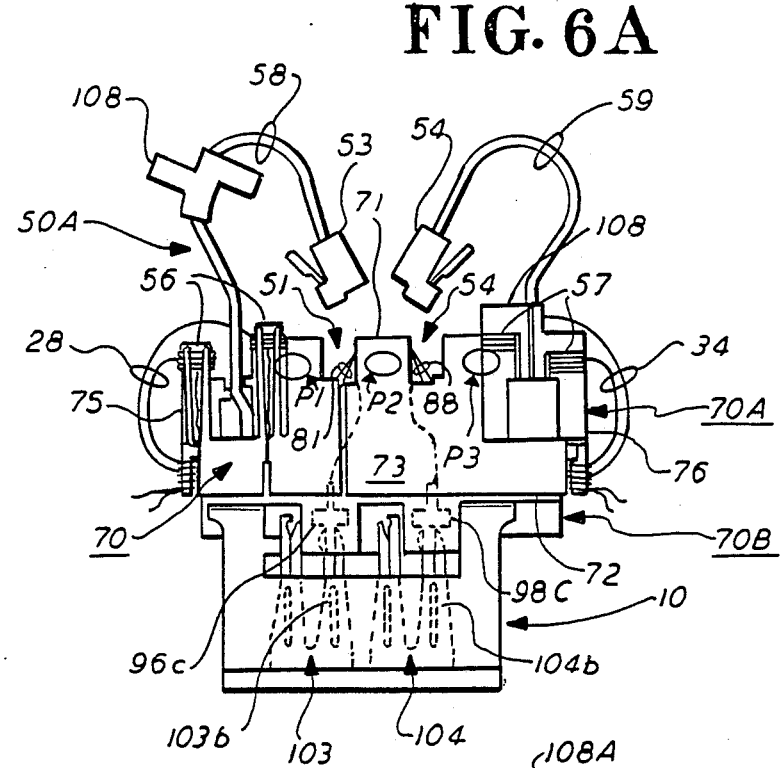
FIGS. 6A and 6B are generally side views of retrofit apparatus embodying the present invention taken along the respective lines 6A—6A and 6B—6B shown in FIG. 5 and in the directions of the respective arrows, but with the telephone plugs in FIG. 6A being shown unplugged from the telephone jacks and with portions of the side wall in FIG. 6B being broken away to show internal structure and with certain structure being shown in cross-section; it will be understood that FIGS. 6A and 6B as shown are rotated 90° counterclockwise, or leftwardly, from FIG. 5.
Figure 6B:
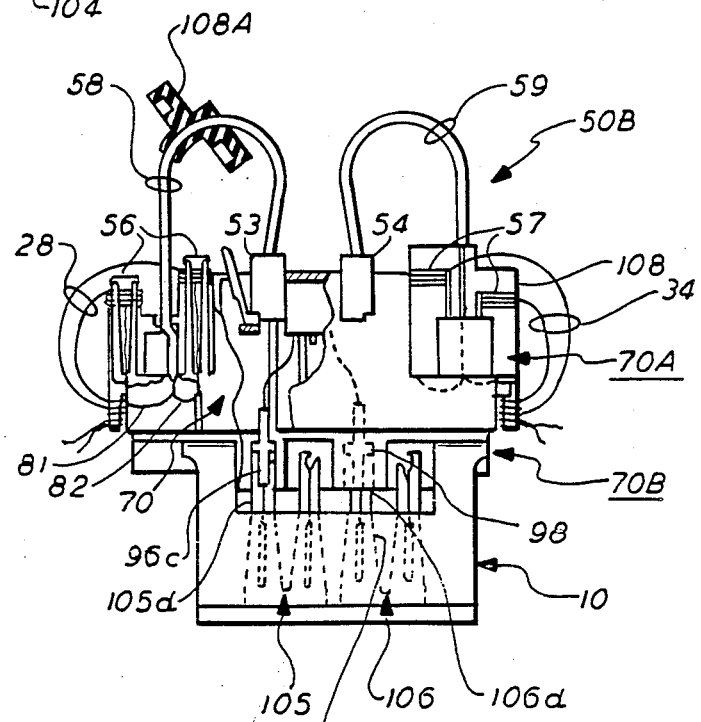
Figure 7:
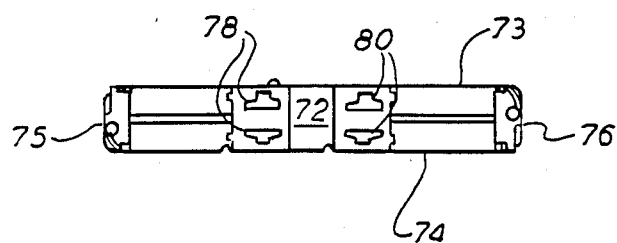
FIG. 7 is a bottom view taken from FIG. 6A.
Figure 8:
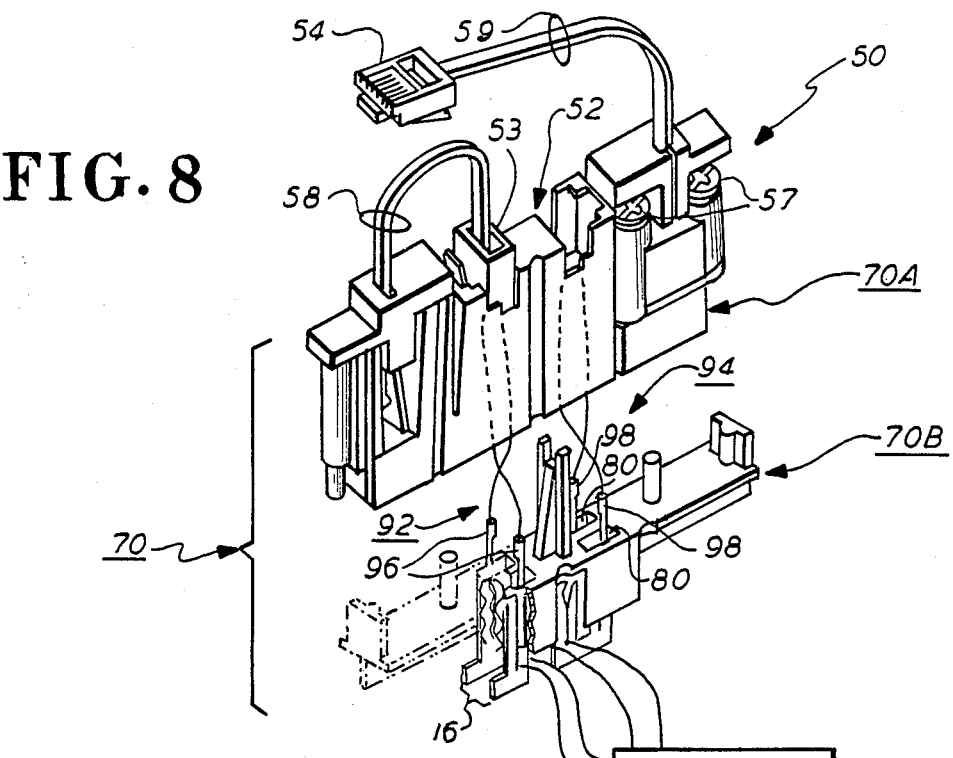
FIG. 8 is a perspective, partially exploded, view of the upper and lower portions of the mounting member of the preferred embodiment of the retrofit apparatus of the present invention.
Figure 9:
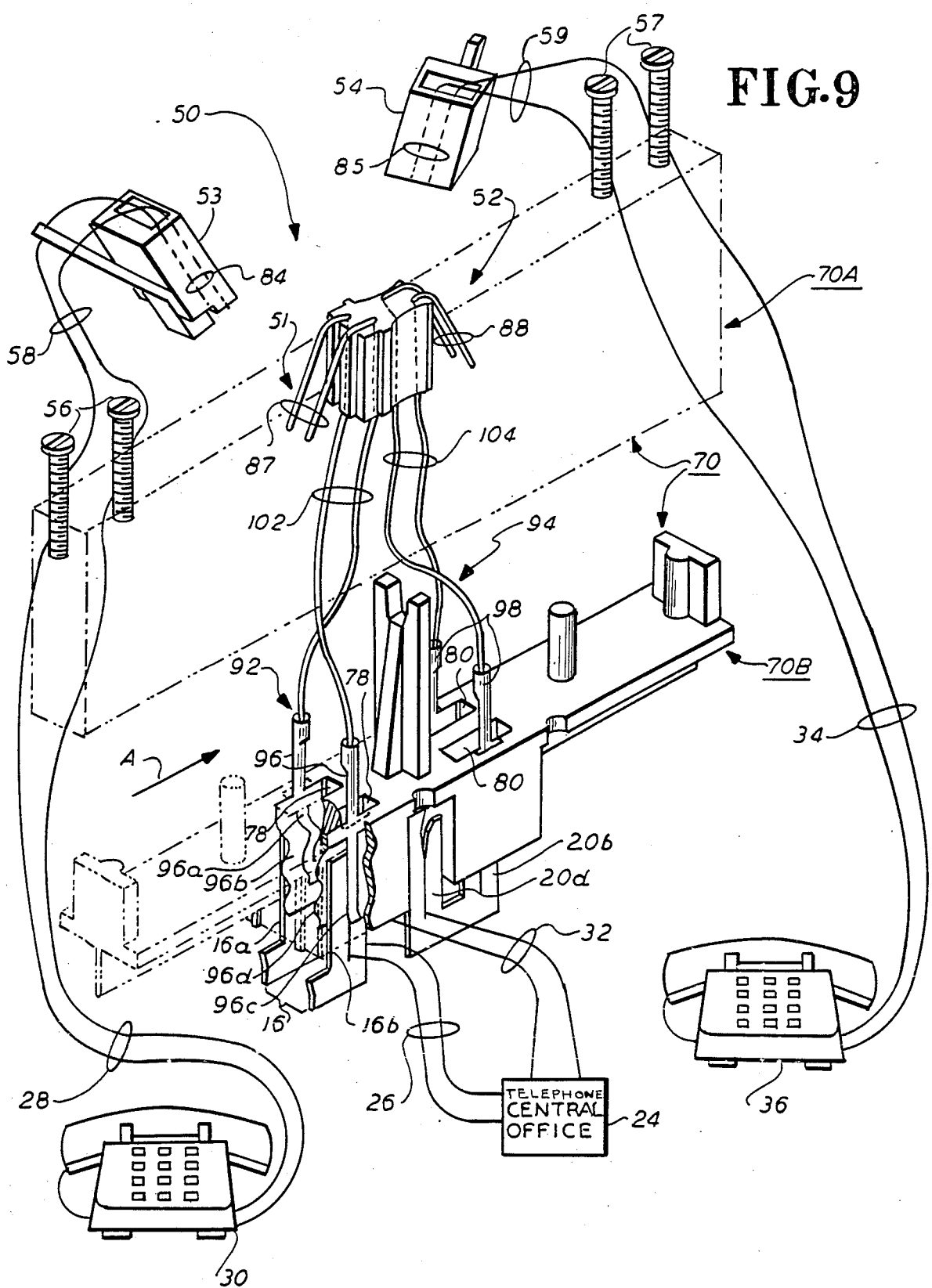
FIG. 9 is a view similar to FIG. 8 but with the upper portion of the mounting member shown in dashed outline for clarity of presentation and with the lower portion of the mounting member shown enlarged to better show the detailed structure thereof.

Referring now to the detailed structure of retrofit apparatus embodying the present invention, reference is now made to FIGS. 6-10, where for convenience of reference structure shown in these FIGS. corresponding to structure shown in FIG. 3 has been given the same numerical designations. [It will be understood that although the bottom mounted and next to bottom mounted retrofit apparatus shown in FIGS. 4 and 5 are identified respectively numerically as 50A and 50B, and identified the same respectively in FIGS. 6A and 6B in accordance with the lines 6A—6A and 6B—6B in FIG. 5, such identification is merely for teaching the staggered mounting of the present invention and that in fact retrofit apparatus 50A and 50B are identical and are each an embodiment of retrofit apparatus 50 of the present invention.] Accordingly, it will be understood that such retrofit apparatus may include the mounting member identified by general designation 70, FIGS. 6A, 6B, and 8, which mounting member, for convenience of manufacture and mounting of internally contained structure, may include an upper mounting member 70A and a lower mounting member 70B as shown in FIG. 8. The upper mounting member 70 (upper portion 70A and lower portion 70B), FIGS. 6A, 6B and 7, includes a top 71, a bottom 72, opposed side walls 73 and 74 (not shown but opposite 73 and it will be understood that not shown opposite side wall 74 is identical in appearance to shown side wall 73) and opposed ends 75 and 76. Two pairs of openings, 78 and 80, FIG. 7, are provided in the mounting member bottom 72 and extending therethrough as shown in FIG. 9. Upon the retrofit apparatus 50 being mounted horizontally to the vertically mounted block 10 as shown in FIGS. 4 and 5, it will be understood that the pairs of openings 78 and 80 formed in the mounting member bottom 72, are displaced horizontally with respect to each other and that the openings of each pair are displaced vertically with respect to each other (the openings are for receiving wedging members for wedgedly engaging the pairs of telephone terminals to mount the mounting member to the telephone terminal block as will be described in detail below). The pair of telephone jacks, indicated by general numerical designations 51 and 52 in FIG. 6A, are provided on the mounting member top 71 generally centrally thereof and, upon the above-noted horizontal mounting of the retrofit apparatus, are displaced horizontally with respect to each other; in this preferred embodiment the telephone jacks 51 and 52 are equivalent in structure to the standard RJ-11 jack in order that they may receive the standard RJ-11 telephone plug typically provided on the present subscriber telephones. The pair of subscriber terminals 56 and 57 (FIGS. 6A and 6B) are mounted generally on the top 71 of the mounting member 70 adjacent the ends 75 and 76 thereof and each pair of subscriber terminals may comprise a pair of screw type terminals as shown. Upon the subscriber premises lines 28 and 34 (FIG. 3) being disconnected from the pairs of telephone terminals 16 and 20 (FIG. 3), the subscriber premises lines 28 and 34 are mechanically and electrically connected to the telephone terminals 56 and 57 as shown in FIGS. 6A, 6B and 9. Telephone plugs 53 and 54 (FIGS. 6A, 6B and 9) are connected electrically to the subscriber terminals 56 and 57 by electrical conductors 58 and 59, and by way of specific example telephone plug 53 of FIG. 6B is connected electrically to the pair of screw terminals comprising subscriber terminals 56 by individual electrical conductors 81 and 82 comprising electrical conductor 58; the corresponding electrical connection of telephone plug 54 in FIG. 6B to the individual screw terminals comprising subscriber terminals 57 is shown by the dashed lines in the rightward portion of FIG. 6B. As may be best seen in FIG. 9, the telephone plugs 53 and 54 are provided with pairs of electrical conductors 84 and 85 (shown in dashed line) connected electrically to the individual pairs of electrical conductors comprising pairs of electrical conductors 58 and 59. Similarly, the telephone jacks 51 and 52, FIGS. 6A and 9, are provided with pairs of electrical conductors 87 and 88 for engaging and electrically interconnecting with the pairs of electrical conductors 84 and 85 of the telephone plugs 53 and 54 upon the plugs being plugged into the jacks.

Figure 10:
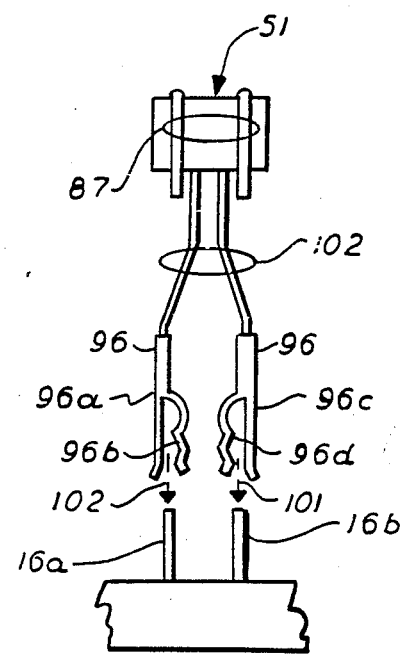
FIG. 10 is a partial elevational view, taken generally in the direction of the arrow A in FIG. 9, showing in side view a pair of the connectors of the present invention for wedgedly engaging telephone terminals to mechanically and electrically interconnect therewith.

Now with regard to the removable mounting of the retrofit apparatus 50 of the present invention to the multi-line telephone block 10 (FIGS. 4-6B), it will be generally understood that the retrofit apparatus 50 is removably mounted to the pairs of telephone terminals provided on the telephone terminal block 10 (e.g. pairs of telephone terminals 16 and 20 of FIG. 3) and thereby removably mounted to the telephone terminal block. Reference is now made to FIG. 9 where it will be understood that the telephone jacks 51 and 52 (indicated generally centrally and at the top of FIG. 9 and only partially shown in solid outline in order that the electrical interconnections of the jack conductors 87 and 88 may be better understood) are provided with pairs of connecting means indicated by general numerical designations 92 and 94. As shown in FIG. 9, the pairs of connecting means 92 and 94 include pairs of electrically conductive wedging members 96 and 98 residing, respectively, in the pairs of openings 78 and 80 provided in the bottom mounting member 70B, and, pairs of electrical conductors 102 and 104 residing generally internally of the upper mounting member 70A and electrically interconnected between the pairs of electrical conductors 87 and 88 of the jacks 51 and 52 and the pairs of wedging members 96 and 98 as shown in the central portion of FIG. 9. The pairs of wedging members 96 and 98 are for wedgedly engaging, to removably mechanically connect thereto and to electrically connect thereto, either the rightward or leftward pairs of prongs (as viewed in FIG. 3) of one of the pairs of telephone terminals provided in the vertical rows 12 and 14 thereof as illustrated in FIG. 3, i.e. by way of example and with regard to the pairs of telephone terminals 16 and 20 at the upper portion of FIG. 3, the pairs of wedging members 96 and 98 (FIG. 9) are for wedgedly engaging either the rightward pairs of prongs 16a and 16b of telephone terminal pair 16 and prongs 20a and 20b of the telephone terminal pair 20, or the leftward pairs of prongs 16c and 16d and 20c and 20d, of the pairs of telephone terminals 16 and 20. It will be understood that insofar as electrically interconnecting the telephone jacks 51 and 52 to the incoming telephone lines 26 and 32 from the telephone central office 24 (FIGS. 3 and 9), it is irrelevant as to whether the pairs of wedging members 96 and 98 wedgedly engage the rightward or the leftward pairs or prongs of the pairs of telephone terminals because the incoming telephone lines will be connected to either the rightward or leftward pairs or prongs of the pairs of telephone terminals and because the rightward and leftward prongs of each of the telephone terminals are electrically common by being interconnected by the rearward cross member thereof as shown in FIG. 3. [It will be understood, and as shown in FIG. 3, that the incoming telephone lines are typically connected to the inner pairs of prongs of the pairs of telephone terminals in accordance with present general telephone practice and such is illustrated in FIG. 3 with regard to incoming telephone lines 26 and 32.] The structure and function of the pairs of wedging members 96 and 98 may be further understood by reference to FIG. 10 with regard to pair of wedging members 96 shown therein where it will be understood that each wedging member of pair of wedging members 96 is provided with pairs of electrically conductive, spring tempered legs or tines, i.e. pairs of legs or tines 96a and 96b and 96c and 96d spaced apart predetermined distances as illustrated in FIG. 10 and for being wedged into mechanical and electrical engagement, as indicated by the arrows 101 and 102, with the representative pair of telephone terminal prongs 16a and 16b. By way of further example, and referring again to lower left portion of FIG. 9, it will be understood that pairs of telephone terminals 16 and 20 (FIG. 3) are partially shown therein and that the legs or tines 96a and 96b of the pair of wedging members 96 wedgedly engage the rightward prong 16a of pair of telephone terminals 16 and that legs or tines 96c and 96d wedgedly engage the rightward prong 16b of pair of telephone terminals 16; similarly, but not shown, it will be understood that the pairs of legs or tines of pair of wedging members 98 of FIG. 9 wedgedly engage the rightward prongs 20a and 20b of the pair of telephone terminals 20 (FIG. 3). Accordingly, it will be understood that upon the pairs of wedging members 96 and 98 being in wedged engagement with the rightward pairs of prongs 16a and 16b and 20a and 20b of the pairs of telephone terminals 16 and 20 of FIG. 3, the mounting member 70, and hence retrofit apparatus 50 of FIG. 9, is mounted rightwardly on the terminal block 10 of FIG. 3.

Figure 11:
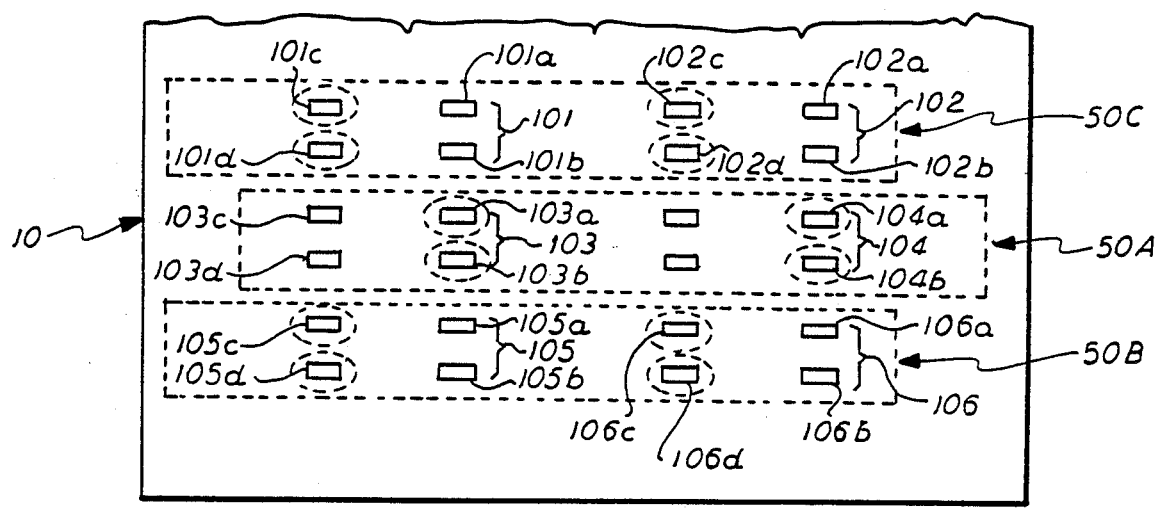
FIG. 11 is a diagrammatical, partial, front elevational view developed generally from the lower portion of FIG. 4 and showing in dashed outline an intermediate and adjacent retrofit apparatus embodying the present invention and illustrating diagrammatically the rightward and leftward staggered or lateral displacement of adjacently mounted retrofit apparatus to the telephone terminal block partially shown in the Figure.

Referring now to the lower portions of FIGS. 4 and 5, and to retrofit apparatus 50A intermediate adjacent retrofit apparatus 50B and 50C, it will be as noted generally above, that intermediate retrofit apparatus 50A mounted on the telephone terminal block 10 such that it is staggered or displaced rightwardly with respect to adjacent retrofit apparatus 50B and 50C, and conversely that adjacent retrofit apparatus 50B and 50C are mounted on the telephone terminal block 10 such that they are staggered or displaced laterally leftwardly with respect to intermediate retrofit apparatus 50A. Such staggered or laterally displaced mounting of such retrofit apparatus may be further understood by reference to FIG. 11 wherein the bottom three pairs of telephone terminals in the two leftward and rightward vertical rows 12 and 14 thereof (FIG. 3) are shown and identified respectively as pairs of telephone terminals 101, 103 and 105 in the leftward partial vertical row and pairs of telephone terminals 102, 104 and 106 in the rightward partial vertical row; it will be understood that only the outwardly extending pairs of prongs of these telephone terminals are shown in solid outline in FIG. 11 since the cross members interconnecting the prongs of each telephone terminal shown in solid outline in FIG. 3 are embedded in the telephone terminal block 10. It will be noted that the pairs of openings 78 and 80, shown in dashed circle outline, provided in the bottom (e.g. bottom 72 of FIG. 7) of intermediate retrofit apparatus 50A respectively surround the rightward pairs of prongs 103a and 103b of pair of telephone terminals 103 and the rightward pairs of prongs 104a and 104b of pair of telephone terminals 104 and hence it will be further understood that the pairs of wedging members 96 and 98 (not shown in FIG. 11 but shown in detail in FIGS. 9 and 10 and described in detail above) residing in these pairs of openings 78 and 80 wedgedly engage the pairs of prongs 103a and 103b and 104a and 104b to removably mechanically mount the intermediate retrofit apparatus 50A to the telephone terminal block 10 in rightward stagger or displacement, and to electrically connect to the pairs of telephone terminals 103 and 104 and thus to a pair of incoming telephone lines (not shown) connected thereto. It will be further noted that the pairs of openings 70 and 80, also shown in dashed outline, provided in the bottoms of adjacent retrofit apparatus 50B and 50C respectively surround the leftward pairs of prongs 105c and 105d and 106c and 106d of pairs of telephone terminals 105 and 106, and leftward pairs of prongs 101c and 101d and 102c and 102d of the pairs of telephone terminals 101 and 102; it will be further understood that the pairs of wedging members 96 and 98 (not shown) residing in the respective pairs of holes 78 and 88 formed in the respective bottoms of adjacent retrofit apparatus 50B and 50C wedgedly engage the noted pairs of leftward prongs to removably mechanically mount the adjacent retrofit apparatus 50B and 50C in leftward stagger or displacement and to electrically connect to the pairs of incoming telephone lines (not shown) connected respectively to the pairs of incoming telephone terminals 105 and 106 and 101 and 102. The rightward stagger or displacement of intermediate retrofit apparatus 50A may also be understood, in side view, from FIG. 6A wherein in dashed outline at the bottom portion of the FIG. wedging member 96c of pair of wedging members 96 and wedging member 98c of pair of wedging members 98 are shown in wedged engagement with the rightward prongs 103b and 104b of pairs of telephone terminals 103 and 104. Similarly, the leftward stagger or displacement of adjacent retrofit apparatus 50B (it will be understood that such will be the same for adjacent retrofit apparatus 50C) may also be understood, in side view from FIG. 6B wherein in solid outline at the bottom portion of the FIG. wedging member 96c of pair of wedging members 96 is shown in wedged engagement with the leftward prong 105 of pair of telephone terminals 103, and wherein in dashed outline, wedging member 98C of pair of wedging members 98 is shown in wedged engagement with the leftward prong 106d of pair of telephone terminals 106.

Figure 12:
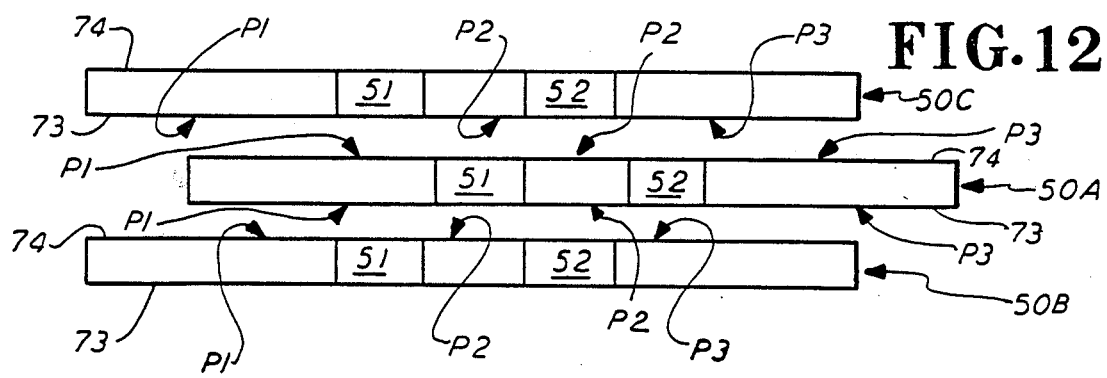
FIG. 12 is diagrammatical, partial, front view developed generally from FIG. 11 illustrating diagrammatically the manner in which opposed portions of adjacent retrofit apparatus close the open side walls of the telephone jacks of the present invention; shown in solid outline in this FIG. 12 are diagrammatical top views of the retrofit apparatus with respect to their orientation shown in FIGS. 6A and 6B.

As noted generally above, in accordance with the teachings of the present invention the reason for the alternate rightward and leftward stagger or lateral displacement of adjacently mounted retrofit apparatus 50 as shown particularly in FIG. 4, is to provide the open side walls of the telephone jacks 51 and 52 (note FIG. 6A) with effective side walls to protect a telephone plug plugged in the open wall jack against disturbance of the types noted above. As may be understood by reference again to FIG. 6A, the side wall 73 of mounting member 70 is provided with solid portions indicated generally by the circles shown thereon and identified respectively by general numerical designations P1, P2 and P3; it will be understood that the opposed side wall 74 (not shown) is provided with identical solid portions P1, P2 and P3. Referring now to FIG. 12, it will be understood that intermediate retrofit apparatus 50A and adjacent retrofit apparatus 50B and 50C mounted in the above-noted rightward and leftward staggered or lateral displacement relationships (as described in detail above with regard to FIG. 11) are shown spaced apart for convenience of reference to the respective solid wall portions P1, P2 and P3, but it will be understood that in actual practice the plurality of retrofit apparatus 50 are mounted in a vertical row in virtual abutting relationship as illustrated in FIG. 4. Thus, it will be understood from FIG. 12 that the open side walls of telephone jack 51 of intermediate retrofit apparatus 50A are closed, or effectively closed, by the solid portion P2 provided on the side walls 74 of adjacent retrofit apparatus 50B and the solid wall portion P2 provided on the side wall 73 of adjacent retrofit apparatus 50C, and that the open side walls of telephone jack 52 provided on the top of intermediate retrofit apparatus 50A are closed, or effectively closed, by the solid wall portion P3 provided on the side wall 74 of adjacent retrofit apparatus 50B and the solid wall portion P3 on the side wall 73 of adjacent retrofit apparatus 50C. Accordingly, it will be understood, and by way of example, that upon the telephone plug 53 (FIG. 6A) being plugged into the open wall jack 51 provided on top of intermediate retrofit apparatus 50A of FIG. 12, the side walls provided to open wall jack 51 by the solid wall portions P2 of adjacent retrofit apparatus 50B and 50C protect the telephone plug 53 against disturbance of the types noted above. Similarly, it will be understood from FIG. 12 that the solid wall portions P1 and P2 of the side wall 74 of intermediate retrofit apparatus 50A close, or effectively close, one of the open side walls of the telephone jacks 51 and 52 mounted on the top of adjacent retrofit apparatus of intermediate retrofit apparatus 50A close, or effectively close, one of the open side walls of telephone jacks 51 and 52 provided on the top of adjacent retrofit apparatus 50B. In summary, and referring to FIG. 4, it will be understood that in accordance with the teachings of the present invention upon a plurality of the retrofit apparatus 50 embodying the present invention being mounted on a telephone terminal block in a row with adjacent ones thereof displaced laterally or staggered with respect to each other, the solid wall portions of the retrofit apparatus close the opposed open sides of the telephone jacks provided on adjacently mounted retrofit apparatus to protect telephone plugs plugged therein against disturbance of the types noted above.

Referring again particularly to FIGS. 4, 5, 6A and 6B, it will be understood that the retrofit apparatus of the present invention may further include insulation or boots 108, made of a suitable electrical insulating material, for electrically insulating the tops of the pairs of subscriber terminals 56 and 57. Each insulator or boot 108 includes an internal passageway, note boot 108A, shown in cross-section in the upper left portion of FIG. 6B, for receiving an electrical conductor, e.g. 58 or 59, of a telephone plug, e.g. 53 or 54, and for permitting the insulator or boot to be slid down the electrical conductor into engagement with the tops of the pairs of telephone terminals 56 and 57 to electrically insulate them.

Figure 13:
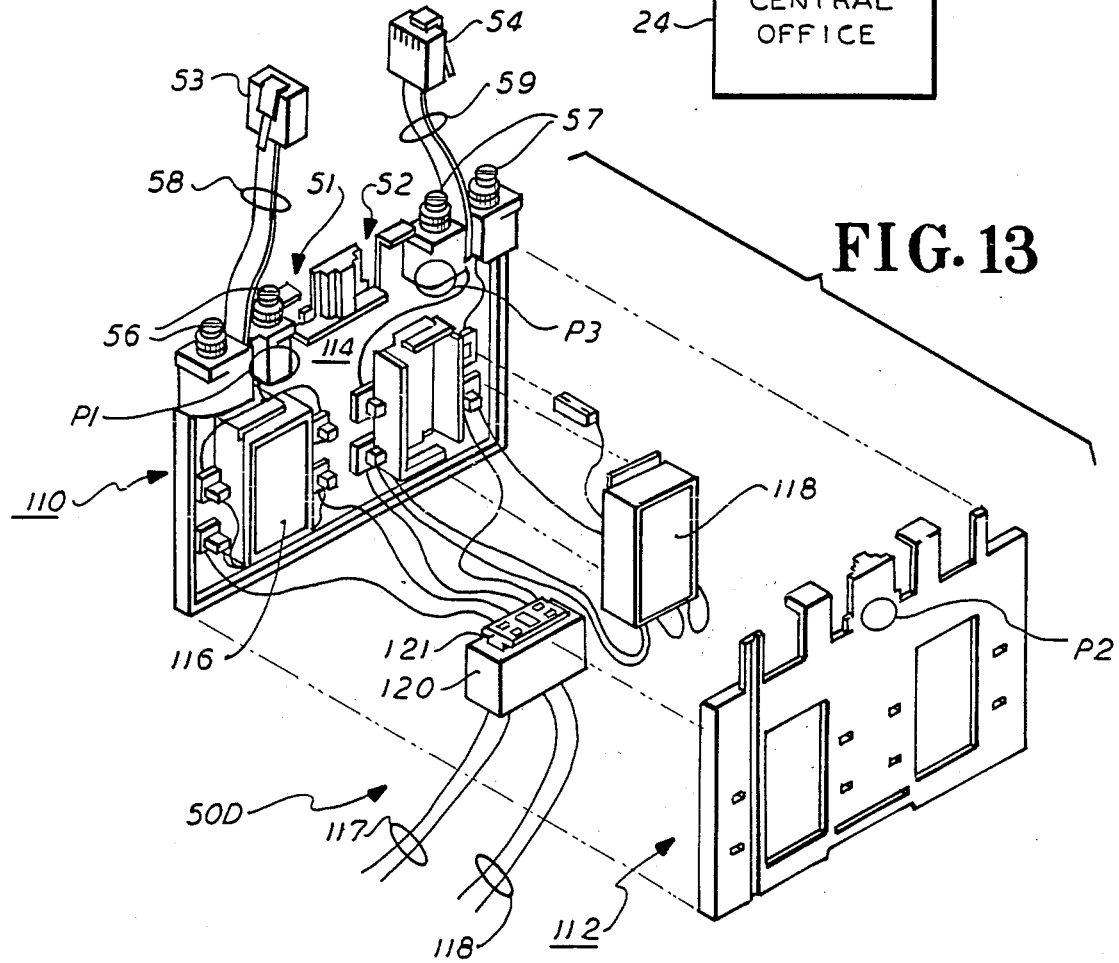

An alternate embodiment of retrofit apparatus embodying the present invention is shown in FIG. 13 and identified by general numerical designation 50D; as before for convenience of reference, structure shown in FIG. 13 corresponding to structure shown in earlier described FIGS. is given the same numerical designations. Retrofit apparatus 50D may include two vertical halves 110 and 112 provided with the respective structures shown, and it will be understood that the retrofit apparatus 50D is made in two or split halves 110 and 112 for convenience of manufacture to provide the internal space 114 indicated generally on vertical half 110 and to permit the insertion and mounting of structure such as the telephone circuits 116 and 118 in the internal space 114; it will be understood that the telephone circuits 116 and 118 may be, for example, a maintenance termination unit, a half-ringer, RFI filter, sneak current protector, or the like, connected electrically, at least, to incoming telephone lines 117 and 118. The retrofit apparatus 50D may also include mounting member 120 including an upper portion 121 to facilitate assembly of the mounting member 120 to the vertical halves 110 and 112 upon their being assembled together as may be done by any one of several methods known to those skilled in the art. It will be understood that although not shown the mounting member 120 is provided internally with pairs of wedging members (e.g. pairs of wedging members 96 and 98 of FIG. 9) for wedgedly engaging the prongs of pairs of telephone terminals to which the incoming telephone lines 117 and 118 may be connected; thus, it will be understood that mounting member 120 removably mounts the retrofit apparatus 50D to a telephone terminal block and electrically connects to the telephone terminals in the same manner as described above. Retrofit apparatus 50D also may be provided with solid wall portions P1, P2 and P3 as shown in FIG. 13 whereby upon a plurality of retrofit apparatus 50D mounted in a vertical row as shown in FIG. 4 with regard to retrofit apparatus 50, with adjacent ones thereof staggered or displaced alternately rightwardly and leftwardly, as described above with regard to retrofit apparatus 50, such solid wall portions P1, P2 and P3 to close and provide side walls to the open wall jacks 51 and 52 shown in FIG. 13 in the same manner as described above with regard to retrofit apparatus 50. Generally it will be understood that retrofit apparatus 50D differs from retrofit apparatus 50 described above in that retrofit apparatus 50D provides an internal space for receiving or housing one or more of the noted telephone circuits.

It will be understood by those skilled in the art that the upper and lower mounting members 70A and 70B of retrofit apparatus 50 (FIG. 8), and the split halves 110 and 112 of retrofit apparatus 50D (FIG. 13), may be injection molded from a suitable plastic and thereafter suitably assembled together such as by a suitable adhesive or by wedged assembly, and the like.

It will be understood by those skilled in the art that many variations and modifications may be made in the present invention without departing from the spirit and the scope thereof.

What is claimed is:

1. Retrofit apparatus for being mounted on a telephone terminal block previously mounted at a subscriber's premises and for providing at least one demarcation point at said telephone terminal block between an incoming telephone line and a subscriber premises line previously interconnected through first terminal means provided on said telephone terminal block, said terminal block provided with a plurality of said first terminal means disposed in a row, comprising telephone jack means for being connected to said first terminal means; second terminal means for being connected to said subscriber premises line upon said subscriber premises line being disconnected from said incoming telephone line; telephone plug means connected to said second terminal means and for being plugged into said telephone jack means to interconnect said incoming telephone line and said subscriber premises line and for being unplugged from said telephone jack means to provide said demarcation point and permit the plug of an operating telephone to be plugged into said telephone jack means to facilitate determination of whether a fault exists on said incoming telephone line or said subscriber premises line; said telephone plug means having a predetermined width and said retrofit apparatus having a width substantially equal to said predetermined width of said telephone plug means, said telephone jack means having opposed open sides, said retrofit apparatus having predetermined portions whereby upon a plurality of said retrofit apparatus being mounted on said telephone terminal block in a row with adjacent ones thereof being displaced laterally with respect to each other, said predetermined portions of said retrofit apparatus close said opposed open sides of said jack means to protect telephone plug means plugged therein against disturbance.

2. Apparatus according to claim 1 wherein said retrofit apparatus provides an internal space for housing a telephone circuit for connection to at least said incoming telephone line.

3. Retrofit apparatus for providing at least one demarcation point at a previously mounted telephone terminal block between an incoming telephone line and a subscriber premises line electrically interconnected at said block by being mechanically connected to electrically conductive first terminal means provided on said block, said telephone terminal block provided with a plurality of said first terminal means disposed in a row, comprising:

mounting means provided with connecting means for mechanically connecting to said first terminal means to mount said mounting means on said telephone terminal block and for electrically connecting to said first terminal means;

telephone jack means mounted on said mounting means and electrically connected to said connecting means;

second terminal means mounted on said mounting means and for being mechanically and electrically connected to said subscriber premises line upon said subscriber premises line being disconnected from said first terminal means;

telephone plug means electrically connected to said subscriber terminal means and for being plugged into said telephone jack means to electrically interconnect said incoming telephone line and said subscriber premises line and for being unplugged from said telephone jack means to provide said demarcation point and permit the plug of an operating telephone to be plugged into said telephone jack means to facilitate determination of whether a fault exists on said incoming telephone line or said subscriber premises line; and said telephone plug means having a predetermined width and said retrofit apparatus having a width substantially equal to said predetermined width of said telephone plug means, said telephone jack means having opposed open sides, and said mounting means having predetermined portions whereby upon a plurality of said mounting means being mounted on said telephone terminal block in a row with adjacent ones thereof being displaced laterally with respect to each other, said predetermined portions of said mounting means close said opposed open sides of said telephone jack means to protect telephone plug means plugged therein against disturbance.

4. Apparatus according to claim 3 wherein said mounting means provides an internal space for housing a telephone circuit for connection to at least said incoming telephone line.

5. Retrofit apparatus for retrofitting a previously mounted telephone terminal block to provide a pair of demarcation points at said telephone terminal block between a pair of incoming telephone lines and a pair of subscriber premises lines previously connected to a pair of telephone terminal means provided on said telephone terminal block, said telephone terminal block provided with a plurality of said pairs of telephone terminal means disposed in a pair of parallel rows on said telephone terminal block, comprising:

mounting means for being removably mounted to said telephone terminal block;

a pair of telephone jack means provided on said mounting means and each telephone jack means provided with connecting means for removably connecting said telephone jack means to one of said pair of telephone terminal means;

a pair of subscriber terminal means mounted on said mounting means and for being connected to said pair of subscriber premises lines upon said subscriber premises lines being disconnected from said pair of telephone terminal means;

a pair of telephone plugs connected to said pair of subscriber terminal means and for being plugged into said pair of telephone jack means to connect said pairs of incoming telephone lines and subscriber premises lines, and upon said pair of telephone plugs being unplugged from said pair of telephone jack means, said pair of demarcation points being provided whereby the plugs of a pair of operating telephones may be plugged into said pair of telephone jack means to facilitate determination of whether faults exist on said incoming telephone lines or said subscriber premises lines; and said mounting means including a generally rectangular mounting member including a top and opposed sidewalls, said telephone plugs having a predetermined width and said opposed side walls of said mounting member spaced apart a distance substantially equal to said predetermined width, said telephone jack means provided on said top of said mounting member and having opposed open sides, and said opposed side walls of said mounting member having predetermined portions whereby upon a plurality of said mounting members being mounted on said telephone terminal block in a row with adjacent ones thereof being displaced laterally with respect to each other, said predetermined portions of said opposed side walls of said adjacent mounting members provide side walls to said telephone jack means to protect telephone plug means plugged therein against disturbance.

6. Apparatus according to claim 5 wherein said mounting means provide internal space for housing at least one telephone circuit for connection to at least one of said incoming telephone lines.

7. Apparatus according to claim 5 wherein said opposed sidewalls of said mounting member are provided with engagement means for maintaining said mounting member laterally displaced with respect to mounting members adjacent thereto in said row thereof.

8. Apparatus according to claim 7 wherein said engagement means comprise a rib provided on one of said sidewalls and a groove provided on the other of said sidewalls.

9. Apparatus according to claim 7:

wherein each of said incoming telephone lines comprise two pairs of incoming telephone conductors and wherein each of said subscriber premises lines comprise a pair of subscriber premises conductors, wherein said pair of telephone terminal means comprise two pairs of telephone terminals displaced horizontally on said telephone terminal block with respect to each other, wherein the telephone terminals of each pair are displaced vertically with respect to each other, wherein each telephone terminal is provided with a pair of electrically connected prongs extending outwardly from said telephone terminal block with the prongs of each terminal displaced horizontally with respect to each other, and wherein one prong of each telephone terminal of one of said pairs of telephone terminals is for being electrically connected to one of said incoming telephone conductors of one of said pairs of incoming telephone conductors;

wherein said mounting means comprise a generally rectangular mounting member including a top, bottom, opposed side walls and opposed ends, wherein upon said telephone block being mounted vertically said mounting member is for being mounted on said telephone terminal block with said sides disposed vertically and with said bottom in engagement with said telephone terminal block, wherein two pairs of openings are provided in said bottom and upon said mounting member being mounted as said, said pairs of openings are displaced horizontally with respect to each other and the openings of each pair are displaced vertically with respect to each other, and wherein each pair of said openings is for receiving inwardly a pair of said prongs and each prong of said pair being provided on a different one of one of said telephone terminals of one of said pairs of telephone terminals;

wherein said telephone jack means are provided on said top of said mounting member generally centrally thereof and upon said mounting member being mounted as said, said telephone jack means being displaced horizontally with respect to each other;

wherein each of said telephone plugs is provided with a pair of first electrical conductors and wherein each of said telephone jack means is provided with a pair of second electrical conductors and wherein upon said telephone plugs being plugged into said telephone jack means said pairs of first and second electrical conductors engage and electrically interconnect;

wherein said connecting means provided with each telephone jack means comprise:

(a) a pair electrically conductive wedging members residing in a pair of said openings for wedgedly engaging a pair of said prongs upon said prongs being received inwardly in said openings to mechanically removably mount said mounting member to said telephone terminal block and to electrically connect to said pair of wedgedly engaged prongs; and (b) a pair of third electrical conductors residing internally of said mounting member and electrically interconnected between one of said pairs of second electrical connectors and said pair of electrically conductive wedging members; and wherein each of said subscriber terminal means comprise a pair of subscriber terminals mounted generally on said top of said mounting member adjacent one of said ends and wherein each pair of subscriber terminals is for being electrically connected to one of said pairs of subscriber premises conductors.

10. Apparatus according to claim 9 wherein said mounting member provides internal space for receiving a pair of telephone circuits for being electrically connected to at least the pair of incoming telephone lines.

11. Apparatus according to claim 9 wherein said pairs of telephone terminal means comprise two parallel rows of said pairs of telephone terminals, wherein said telephone plugs have a predetermined width, wherein said opposed side walls of said mounting members are spaced apart a distance substantially equal to said predetermined width due to the predetermined vertical spacing between said pairs of telephone terminals, wherein said telephone jack means have opposed open sides, wherein said opposed side walls of said mounting member have predetermined portions wherein upon a plurality of said mounting members being mounted adjacently on said telephone terminal block in a vertical row with adjacent ones thereof being displaced a predetermined distance laterally with respect to each other, said predetermined portions of said opposed side walls of mounting members opposite an intermediate mounting member provide side walls to the telephone jack means of said intermediate mounting member to protect a telephone plug plugged therein against disturbance.

12. Apparatus according to claim 11 wherein said opposed side walls of said mounting member are provided with engagement means for maintaining said mounting members laterally displaced with respect to mounting members adjacent thereto in said row thereof.

13. Apparatus according to claim 12 wherein said engagement means comprise at least one rib provided on one of said side walls and at least one groove provided on the other of said side walls, said rib and groove being disposed parallel to said opposed ends of said mounting member, and upon said plurality of mounting members being mounted in said vertical row, said rib of one mounting member for being received in the groove of the adjacent mounting member to maintain said mounting members in said lateral displacement.

* * * * *

UNITED STATES PATENT AND TRADEMARK OFFICE
CERTIFICATE OF CORRECTION

PATENT NO. : 4,919,544
DATED : April 24, 1990
INVENTOR(S) : Thomas G. Graham

It is certified that error appears in the above-identified patent and that said Letters Patent is hereby corrected as shown below:

Column 1, line 30, delete "and"; line 63, change "numberical" to --numerical--.

Column 6, line 12, change "adjacentretrofit" to --adjacent retrofit--.

Column 10, line 53, after "apparatus" insert --50C and that solid wall portions P1 and P2 provided on side wall 73--.

Column 15, line 15, after "pair" insert --of--.

Signed and Sealed this

Twenty-second Day of October, 1991

Attest:

HARRY F. MANBECK, JR.

Attesting Officer     Commissioner of Patents and Trademarks